United States Patent
Tumback et al.

(10) Patent No.: US 6,349,804 B1
(45) Date of Patent: Feb. 26, 2002

(54) FRICTION-BAND BRAKE

(75) Inventors: Stefan Tumback, Stuttgart; Martin-Peter Bolz, Oberstenfeld, both of (DE)

(73) Assignee: Robert Bosch GmbH, STuttgart (DE)

( * ) Notice: Subject to any disclaimer, the term of this patent is extended or adjusted under 35 U.S.C. 154(b) by 0 days.

(21) Appl. No.: 09/600,088

(22) PCT Filed: Oct. 27, 1999

(86) PCT No.: PCT/DE99/03417

§ 371 Date: Aug. 28, 2000

§ 102(e) Date: Jul. 28, 2000

(87) PCT Pub. No.: WO00/29758

PCT Pub. Date: May 25, 2000

(30) Foreign Application Priority Data

Nov. 13, 1998 (DE) .......................................... 198 52 340

(51) Int. Cl.$^7$ ........................... F16D 49/08; F16H 57/10
(52) U.S. Cl. ....................... 188/77 R; 188/249; 188/259
(58) Field of Search ............................ 188/77 W, 77 R, 188/249, 255, 250 H; 192/107 T, 80; 475/271

(56) References Cited

U.S. PATENT DOCUMENTS 3,841,447 A * 10/1974 Schlapmann et al. ..... 188/77 R

FOREIGN PATENT DOCUMENTS

| DE | 172 845 | 7/1906 |
|---|---|---|
| DE | 290 668 C | 3/1916 |
| FR | 563 517 A | 12/1923 |
| FR | 1 125 703 A | 11/1956 |

* cited by examiner

Primary Examiner—Douglas C. Butler
(74) Attorney, Agent, or Firm—Michael J. Striker

(57) ABSTRACT

In a friction belt brake with a rotary cylinder (1), which is wound around at least a part of its circumference by a friction belt (2), and with a support (3) for the friction belt, which in a first braking position, can be pivoted around a first axis (9; 25) and two securing points (10, 11) for respectively opposite end sections of the friction belt, wherein a first of the two securing points has a longer lever arm (a) in relation to the first axis than the second securing point (11), the provision is made that in a second braking position, the support (3) can be pivoted around a second axis with regard to which the second securing point has a longer lever arm than the first.

13 Claims, 4 Drawing Sheets

FRICTION-BAND BRAKE

PRIOR ART

The invention relates to a friction belt brake with a rotary cylinder which is wound around at least part of its circumference by a friction belt, and with a support for the friction belt which, in a first braking position, can be pivoted around a first axis and has two securing points for respectively opposite end sections of the friction belt. In this connection, a first of the two securing points has a longer lever arm in relation to this first axis than the second securing point.

A differentially acting friction belt brake of this kind is shown in FIG. 6. The figure depicts a rotary cylinder 1 rotating in the clockwise direction, with a friction belt 2 that is fastened to a support 3 at two securing points 10, 11. The support 3 can rotate around a fixed axis 9 disposed between the securing points; the securing points consequently define lever arms with the lengths a and b in relation to this axis 9.

The distance a+b between the securing points 10, 11 here is equal to the diameter of the rotary cylinder 1.

The brake has an equilibrium position in which the friction belt 2 is stretched tight and exerts a force $F_0$ and $F_1$, respectively, on the securing points 10, 11. The torques exerted by these forces on the fixed axis 9 are equal and opposite so that the support 3 does not move. A braking moment with the value $(F_1-F_0)r$ then acts on the rotary cylinder 1, where r is the radius of the rotary cylinder and the bearing of the rotary cylinder is loaded with the sum of the forces $F_0+F_1$.

If a slight adjusting force $F_s$ is exerted with a torque $L_s$ on the support 3, then the friction belt 2 is stretched tighter, wherein a slight adjusting force $F_s$ is sufficient to cause both $F_1$ and $F_0$ to increase sharply.

A disadvantage of this known friction belt brake is that it is not equally suited to braking rotational movements in different directions. As a result, with the friction belt brake shown in FIG. 6, the clockwise rotation of the rotary cylinder 1 results in the fact that the friction belt 2 is automatically tightened at the securing point 11 so that the above-described equilibrium position can automatically set in and be maintained without an adjusting force $F_s$ having to be exerted in order to achieve this. If the rotary cylinder 1 were to rotate counterclockwise, then the force $F_0$ acting on the securing point 10 would be greater than the force $F_1$ acting on the securing point 11 and since its lever arm a is also longer than the lever arm b of the securing point 11, there is no equilibrium position. Therefore, during a counterclockwise rotation, a braking action can only be produced through the exertion of a considerable adjusting force $F_s$.

ADVANTAGES OF THE INVENTION

The invention has the advantage over the prior art that it permits an equal brake function to be produced independent of the rotation direction of the rotary cylinder to be braked. To this end, the provision is made that in the friction belt brake according to the invention, the support has two braking positions which correspond to the two possible rotation directions of the rotary cylinder, wherein in the second braking position, the support can be pivoted around a second axis in relation to which the second securing point has a longer lever arm than the first. This permits the adjustment of a stable equilibrium of the brake forces for both rotation directions.

In order to assure a symmetrical brake behavior, it is preferable that the retainer is in a position to execute a movement that is symmetrical in relation to a plane extending through the axis of the rotary cylinder. The axes of the support are preferably virtual, i.e. are not defined by means of a physical object.

The movement of the retainer from a central position into one of the two braking positions can have a multitude of rotational axes which continuously transition into one another in the course of the movement of the retainer, so-called instantaneous poles. A simple construction which permits such a movement of the support is a four-bar, i.e. a structure made up of three elements connected to one another in series, wherein the support constitutes the middle element.

In a four-bar whose lateral elements experience only tensile stress, these lateral elements can be constituted in a particularly simple way by means of end sections of the friction belt.

In such an instance, the securing points can be simple pins around which the friction belt is immovably wound. When a friction belt with inherent rigidity is used, the immobility can be simply produced by virtue of the fact that in the points at which the friction belt touches the pins, it has a curvature when unstressed which comes to rest against a part of the surface of the pin.

According to a particularly preferred embodiment, the distance of the securing points from one another is smaller than the diameter of the rotary cylinder. This leads to the fact that the friction belt 2 can come into contact with the rotary cylinder over more than half of its circumference, i.e. there is a large available contact surface on which a powerful friction can be produced. Another important advantage is that with a construction of this kind, the forces $F_1, F_0$ acting on the two securing points are no longer parallel, but have opposite signed components in the direction of the connection between the two securing points. These components compensate for each other. The force transmitted by the friction belt onto the bearing of the rotary cylinder is therefore less than the sum of the amounts of the two forces $F_1$ and $F_0$; as in the above-described conventional friction belt brake, however, the brake force is proportional to the difference of the amounts of these two forces. Since the winding angle of the friction belt, i.e. the portion of the circumference of the rotary cylinder that is contacted by the friction belt, is also increased, less tension of the friction belt is required in order to produce a given braking moment. This means that with the same braking moment, the bearing of the rotary cylinder is less stressed than in the conventional construction and that the friction belt brake according to the invention permits a higher braking moment to be exerted without changing the construction of the rotary cylinder bearing.

A partial compensation of the forces $F_0, F_1$ acting on the securing points would also be produced if their distance were greater than the diameter of the rotary cylinder. In such an instance, however, the contact length of the friction belt with the rotary cylinder is reduced so that relatively high forces $F_0$, $F_1$ are required in order to produce a given braking moment and the bearing of the rotary cylinder is powerfully stressed despite the partial compensation.

In a preferred construction of the friction belt, the provision is made that the support has an engaging point for an adjusting force acting essentially in the circumference direction of the rotary cylinder, which is disposed on the opposite side of the securing points in the radial direction with regard to the rotary cylinder. The two securing points and the engaging point define the corners of a triangle.

An annular sector is suitably disposed so that it encloses the rotary cylinder and can rotate around it. The friction belt rests against its inner wall in a rest position in which it does not touch the rotary cylinder and does not exert any braking force. The annular sector thus serves on the one hand to determine the rest position of the friction belt and prevents this belt from coming into contact with the rotary cylinder provided that the friction belt brake is not disposed in the braking position, and on the other hand, it protects the friction belt from external corrosion.

This annular sector preferably has a gearing which is engaged by a gear or a worm with which the retainer can be moved into the first or second braking position.

In this connection, the engaging point can be a hole in the support in which a guide pin connected to the annular sector engages.

The friction belt brake according to the invention is particularly suited for use in a planetary gear, in particular in a two-stage planetary gear of a starter generator for a motor vehicle.

Other features and advantages of the invention ensue from the description of exemplary embodiments below.

DRAWINGS

DESCRIPTION OF THE EXEMPLARY EMBODIMENTS

Figure 1:
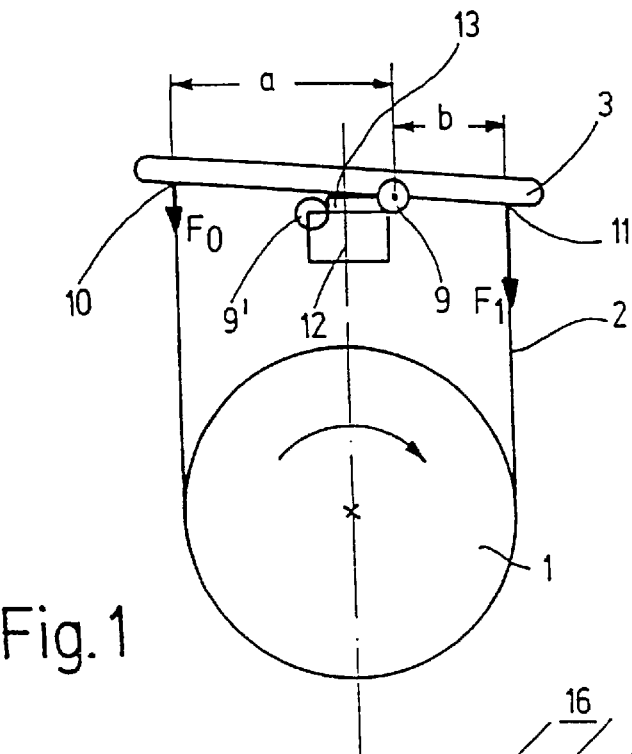
FIG. 1 shows a schematic side view of a first friction belt brake according to the invention.

In a very schematic fashion, FIG. 1 shows a friction belt brake according to a first exemplary embodiment of the invention. On a base 12 that is fixed in relation to the rotary cylinder 1, a support 3 is supported so that it can pivot around two joints 9, 9'. A first of these joints 9' connects the base 12 to a plate 13 that rests flat against the base 12 in the braking position shown. A second joint 9 at the opposite end of the plate 13 connects this plate to a support 3 which is engaged at the securing points 10, 11 by a friction belt 2. In the depicted position of the support 3, the securing point 10 is lifted up and the friction belt 2 is stretched tight around the rotary cylinder 1. As in the conventional friction belt brake shown in FIG. 6, the clockwise rotating rotary cylinder 1 exerts a force $F_1$ on the securing point 11 that is greater than the force $F_0$ on the securing point 10. This produces an effective braking of a clockwise rotation.

In order to brake a counterclockwise rotation of the rotary cylinder, the support 3 is tilted around the joint 9', out of its rest position in which this support 3 and the plate 13 rest flat against the base 12. In the braking position, not shown in the figure, that is reached by means of this second tilting, the position of the support 3 is essentially axially symmetrical with regard to the plane 14 extending through the axis of the rotary cylinder 1 and the center of the base 12. As a result, the length ratios of the lever arms of the two securing points are interchanged: the securing point 10 has a lever arm with the length b in relation to the joint 9' and the securing point 11 has a lever arm with the length a. Due to the rotation direction, the values of the engaging forces $F_0$ and $F_1$ are interchanged. The braking action of the friction belt brake is consequently identical for both rotation directions.

Figure 4:
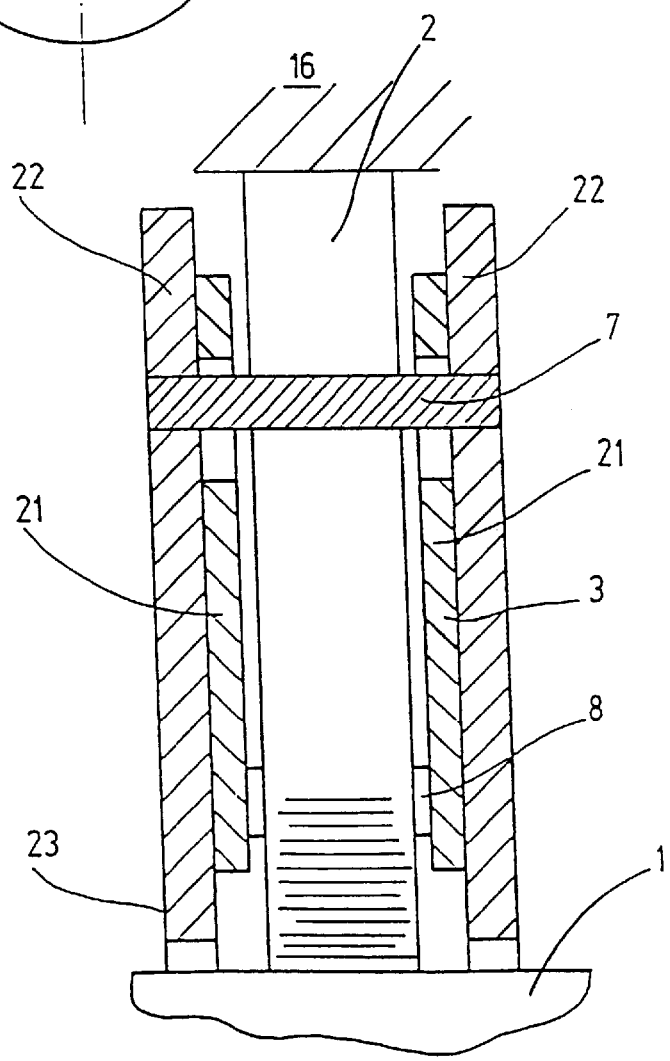
FIG. 4 shows a side view of the friction belt brake from FIG. 2.
Figure 2:
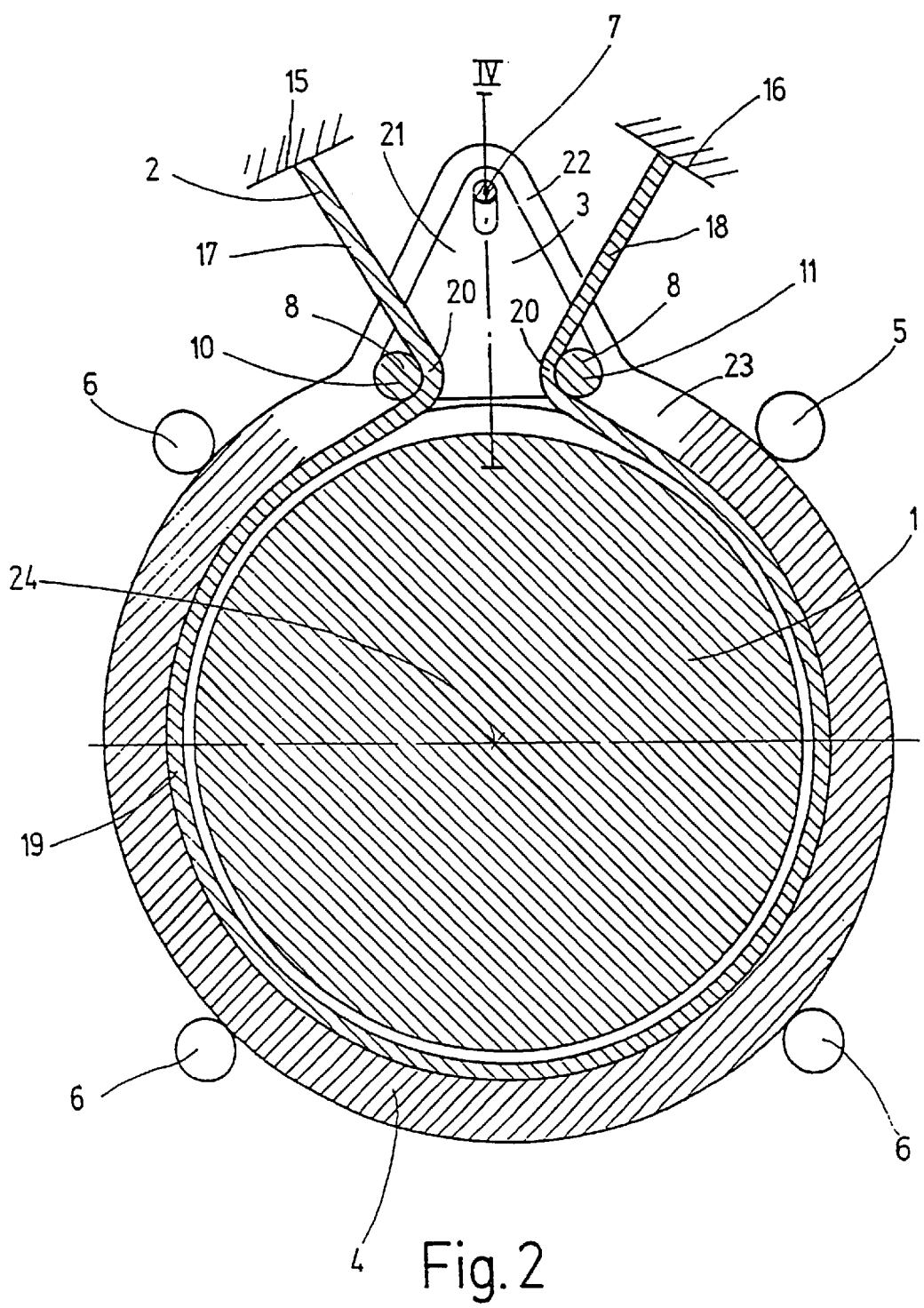
FIG. 2 shows a section through a modified embodiment of the friction belt brake in a rest position.

FIG. 2 shows a cross-sectional view of a modified embodiment of the friction belt brake according to the invention in a rest position. A friction belt 2 with inherent rigidity, e.g. made of spring steel with a friction promoting coating on the surface oriented toward the rotary cylinder 1, has two end sections 17, 18 which are affixed to points 15, 16 of an only partially shown housing, and a middle section 19, which winds around a rotary cylinder 1 over a large part of its circumference. Before being installed into the friction belt brake, the friction belt 2 is pre-curved by approximately 90° at two points 20 which constitute the transition between the middle section 19 and end sections 17, 18. Upon being installed, these pre-curved points come to rest against cylindrical pins 8 on which the friction belt is practically immovable due to the above-mentioned curvature, but can rotate around the pins 8. The pins 8 consequently constitute securing points 10, 11 which are acted upon, if need be, by braking forces transmitted by the friction belt 2, as described above in connection with FIG. 6. The pins 8 respectively connect two corners of triangular plates 21 (see FIG. 4) to a support 3. The plates 21 can be pivoted on a guide pin 7 by means of an elongated opening formed in their third, upper corner, and are suspended so that they can slide for a small distance vertically. The guide pin 7 in turn connects the tips of two triangular projections 22 of rings 23 which encompass the rotary cylinder 1 over its entire circumference and define the annular sector 4 at both ends in the axial direction. In FIG. 4, this design is depicted in a cross section along the line IV from FIG. 2.

The annular sector 4 is secured by means of a number of guide bolts 6 disposed on its circumference, three of them in FIG. 2, so that it can rotate around its central axis 24, which is also the axis of the rotary cylinder. A gear 5 engages in a gearing on the outer circumference of the annular sector in order to rotate it clockwise or counterclockwise into a braking position and back again.

When the annular sector 4 rotates, then the guide pin 7 rigidly connected to it consequently follows as does the upper corner of the support 3. This causes a pivoting motion of the entire support around the axis established by the guide pin 7 in which the points 20 of the friction belt 2 respectively rotate around the pins 8. Because the friction belt, due to its curvature, cannot slide on the pins 8, the length of the end sections 17, 18 is maintained during the rotation and only a deformation of the end sections 17, 18 takes place, which is essentially manifested by a pivoting of the end sections 17, 18 around the points 15 and 16. The disposition of the end sections 17, 18 and the support 3 can therefore be thought of as a four-bar, wherein the points 15, 16 represent fixed points, the sections 17 and 18 represent outer levers connected to these, and the support 3 represents a central lever of the four-bar.

Figure 3:
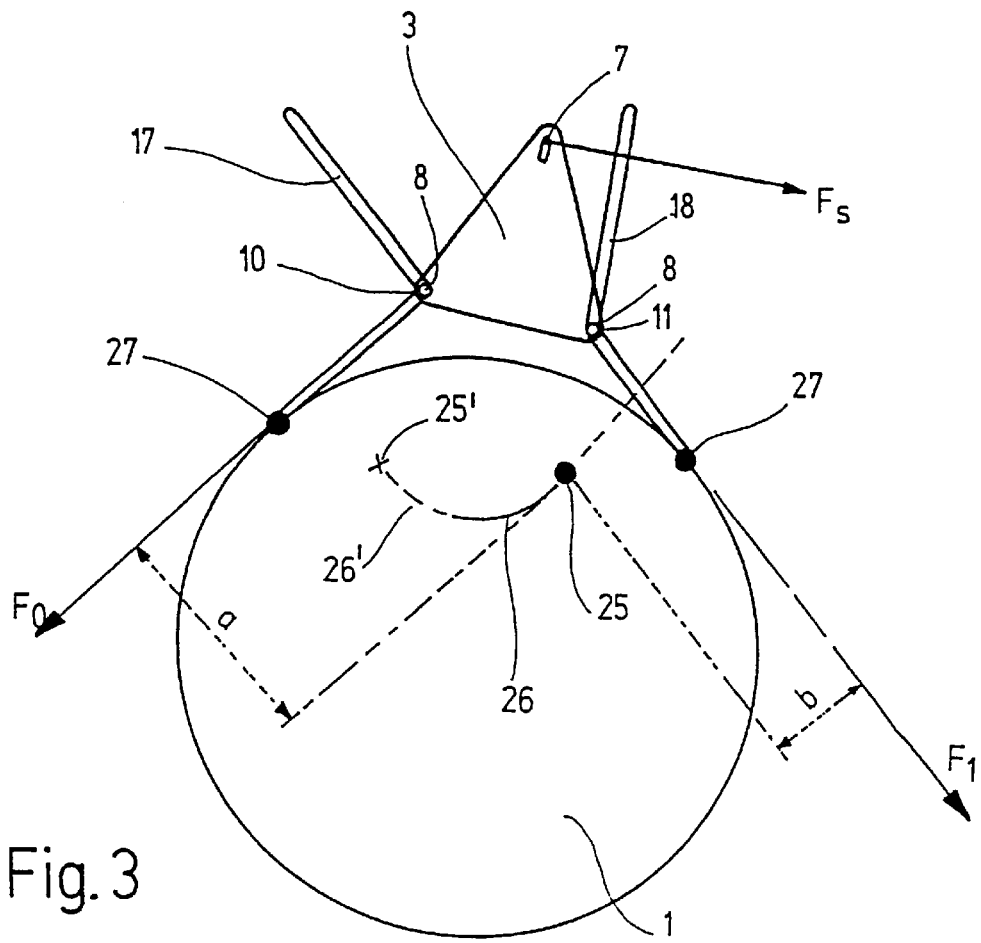
FIG. 3 shows the friction belt brake from FIG. 2 in a braking position.

Such a movement leads to a tightening of the friction belt 2 which causes it to come into contact with the surface of the rotary cylinder 1. Such a disposition and the forces that occur in it are schematically depicted in FIG. 3.

In the position shown, the support 3 can be rotated around an instantaneous pole 25, which represents a virtual rotational axis for its movement. The position of this instantaneous pole is defined in each position of the support 3 as the point at which the projections of the two outer levers of the four-bar intersect, i.e. the end sections 17, 18 of the friction belt 3. In the position shown in FIG. 2, this instantaneous pole is disposed in the plane of symmetry of the friction belt brake, which corresponds to the intersecting plane indicated by IV. In the course of the movement of the support 3 into the position shown in FIG. 3, the instantaneous pole moves along the curve 26 until it reaches the location indicated. The lever moments of the forces $F_0$, $F_1$ acting on the friction belt 2 must be taken into consideration in regard to the instantaneous pole 25. In this connection, the lever arm corresponds to the respective length of the projections a and b of the instantaneous pole 25 onto the tangent of the cylinder 1 at the corresponding separation point 27 at which the friction belt 2 begins to detach from the rotary cylinder 1.

Figure 6:
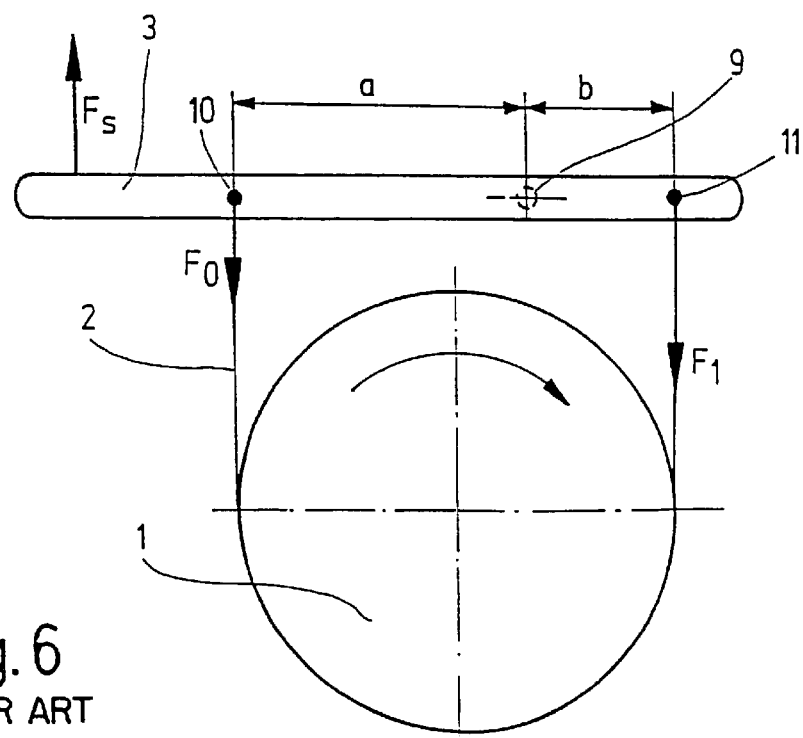
FIG. 6 shows a conventional friction belt brake.

As in the conventional friction belt brake described in conjunction with FIG. 6, this friction belt brake has an equilibrium braking state in which the lever moments $L_0=aF_0$ and $L_1=bF_1$ cancel each other out so that no net torque acts on the support 3 and this produces a braking moment r ($F_1-F_0$) where r is the radius of the rotary cylinder 1, without a braking force $F_s$ having to be exerted for this purpose.

When a braking force $F_s$ is exerted on the support 3, as in the conventional friction belt brake, this leads to a tightening of the friction belt 2 and as a result, to an increase in the braking force. The friction belt brake shown in FIG. 3, however, has the particular feature that the more the support 3 pivots in the clockwise direction, the further the instantaneous pole 25 travels on the curve 26 toward the pin 8 associated with the end section 18. This results in the fact that the further the ratio of the lever arm lengths a, b shifts toward a, the greater the braking force becomes. In the limit case, the friction belt 2 could come into contact with the rotary cylinder 3 right at the pin 8 associated with the end section 18, in which case b would be practically zero. In this instance, the force $F_1$ would produce practically no torque; therefore this position cannot be reached as an equilibrium position. This friction belt brake thus prevents a random increase in friction force, possibly due to the penetration of a small foreign body or an impurity between the surface of the rotary cylinder 1 and the friction belt 2, from leading to an excessive increase in the braking force and consequently a locking of the brake: such an occurrence merely causes the support 3 to pivot further by a slight angle so that a new equilibrium ratio of the torques sets in which corresponds to the increased braking force.

The same function as described above is produced when braking a rotation of the rotary cylinder 1 in the counter-clockwise direction. Moving the guide pin 7 out of the rest position toward the left in the FIG. produces a shifting of the instantaneous pole of the support 3 along the dashed curve 26' that is a mirror image of the curve 26 until it reaches a position 25' in which the friction belt 2 winds tightly around the rotary cylinder 1 and the brake begins to engage without the exertion of an additional external braking force. In this second braking position, the force $F_0$ engaging the securing point 10 has a lever arm with the length b and the force $F_1$ has a longer lever arm with the length a.

Figure 5:
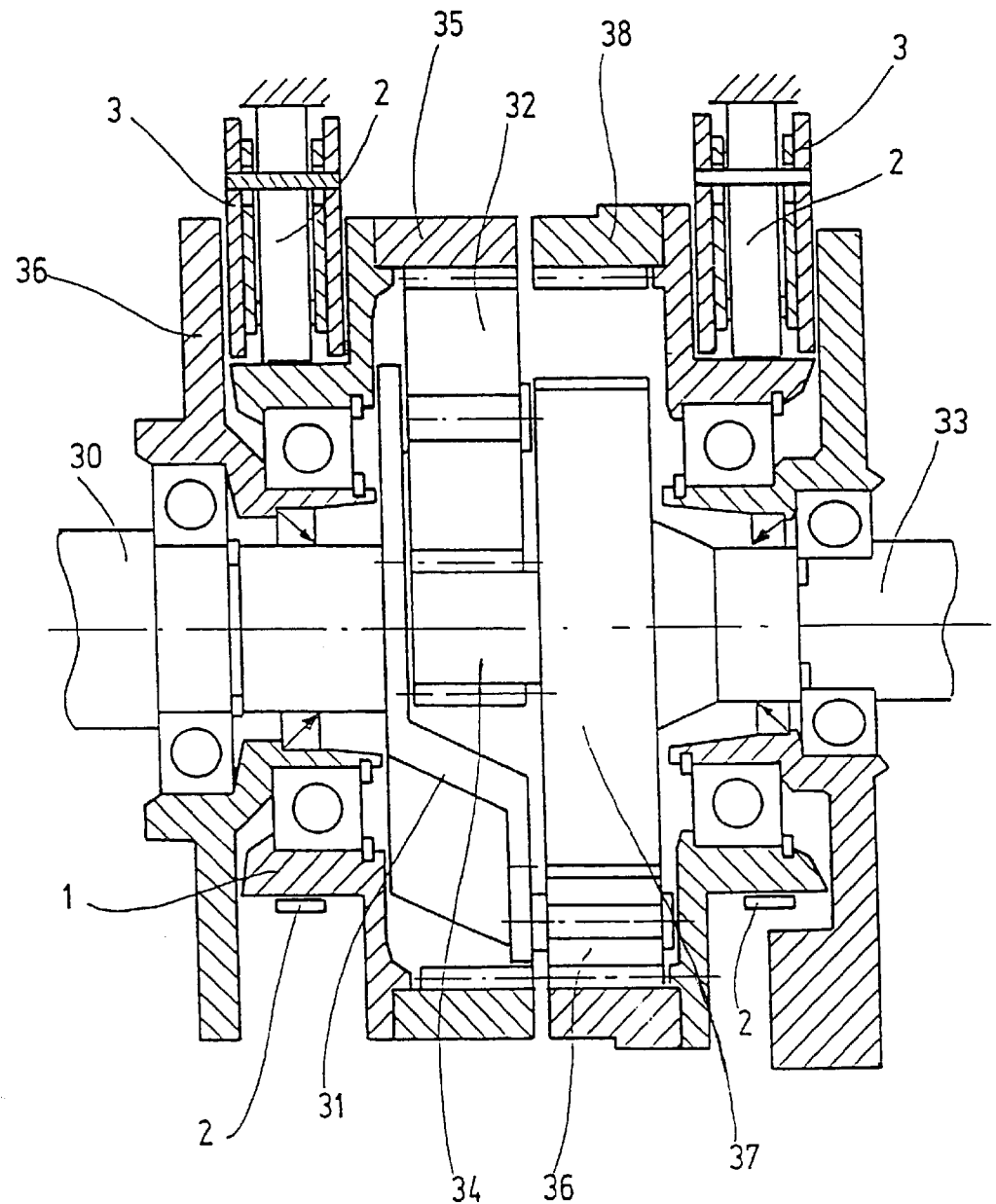
FIG. 5 shows a transmission of a starter generator with a friction belt brake according to the invention.

In an axial longitudinal section, FIG. 5 shows a two-stage planetary gear of a starter generator for a motor vehicle. A transmission shaft 30 drives a planetary gear carrier 31 of a first transmission stage to rotate. The planet gears 32 carried by this carrier 31 rotate between a sun gear 34 and an internal gear 35 which is affixed to a rotary cylinder 1. The outer radius of the rotary cylinder 1 is smaller than that of the internal gear 35 as well as that of a neighboring housing flange 36. The carrier 3 of the friction belt brake is partially accommodated in the groove thus formed between the internal gear 35 and the housing flange 36 by the rotary cylinder 1, which is reproduced in this FIG. in the same depiction as in FIG. 4. When the brake associated with the internal gear 35 is applied and the internal gear 35 is stationary, rotary motion is transmitted between the transmission shaft 30 and the generator shaft 33 by means of the planet gears 32 and the sun gear 34.

Furthermore, planet gears 36 of a second transmission stage are mounted on the planetary gear carrier 31, and this second transmission stage also has a sun gear 37 and an internal gear 38 connected to the generator shaft 33, and this internal gear 38 can be braked by means of a second friction belt brake of the type described in connection with FIGS. 2 to 4. As a result of the different radii and tooth counts of the gears of the two different stages, the transmission ratio of the transmission can be chosen as a function of which of the two brakes is being applied.

Based on the symmetrical design of the two brakes, their effectiveness is the same independent of the direction in which the rotation to be braked occurs.

What is claimed is:

1. A friction belt brake with a rotary cylinder (1), which is wound around at least a part of its circumference by a friction belt (2), and with a support (3) for the friction belt (2), which in a first braking position, can be pivoted around a first axis (9; 25) and two securing points (10, 11) for respectively opposite end sections of the friction belt (2), wherein a first (10) of the two securing points has a longer lever arm (a) in relation to the first axis than the second securing point (11), characterized in that in a second braking position, the support (3) can be pivoted around a second axis (9'; 25') with regard to which the second securing point (11) has a longer lever arm than the first (10), wherein between the braking positions, the support (3) executes a motion in which the two axes (25, 25') continually transition into each other.

2. The friction belt brake according to claim 1, characterized in that the support (3) is in a position to execute a motion that is symmetrical with regard to a plane extending through the axis (24) of the rotary cylinder (1).

3. The friction belt brake according to claim 1, characterized in that the axes (25, 25') are virtual.

4. The friction belt brake according to claim 1, characterized in that the support (3) is the central element of a four-bar.

5. The friction belt brake according to claim 4, characterized in that side elements of the four-bar are constituted by the end sections (17, 18) of the friction belt (2).

6. The friction belt brake according to claim 5, characterized in that the securing points (10, 11) are constituted by pins (a) around which the friction belt (2) is wound in an immobile fashion.

7. The friction belt brake according to claim 1, characterized in that the distance between the securing points (10, 11) is less than the diameter of the rotary cylinder (1).

8. The friction belt brake according to claim 1, characterized in that the support (3) has an engaging point for an adjusting force ($F_s$) acting essentially in the circumference direction of the rotary cylinder (1), and this engaging point is disposed on the other side of the securing points (10, 11) in the radial direction with regard to the rotary cylinder (1).

9. The friction belt brake according to claim 8, characterized in that the annular sector (4) has a gearing which is engaged by a gear (5) or a worm for moving the support (3) into the first or second braking position.

10. The friction belt brake according to claims 8, characterized in that the engaging point is a hole in the support (3) in which a guide pin (7) engages, which is connected to the annular sector (4).

11. The friction belt brake according to claim 1, characterized in that an annular sector (4) encompasses the rotary cylinder (1) in rotary fashion and the friction belt (2) rests against its inner wall in a rest position.

12. The friction belt brake according to claim 1, characterized in that the rotary cylinder (1) is part of an internal gear (35; 38) of a planetary gear.

13. A starter generator for a motor vehicle with a planetary gear that has two stages, characterized in that a friction belt brake according to claim 1 is provided on the internal gear (35; 38) of each stage.

* * * * *